United States Patent
Qi et al.

(10) Patent No.: US 10,642,179 B2
(45) Date of Patent: May 5, 2020

(54) SECURITY TONER AND PROCESS USING THEREOF

(71) Applicant: XEROX CORPORATION, Norwalk, CT (US)

(72) Inventors: Yu Qi, Penfield, NY (US); Eugene F. Young, Rochester, NY (US); Shigeng Li, Penfield, NY (US); Chieh-Min Cheng, Rochester, NY (US); Richard P. N. Veregin, Mississauga (CA); Laura Jenson, Ontario, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/878,962

(22) Filed: Jan. 24, 2018

(65) Prior Publication Data
US 2019/0227452 A1     Jul. 25, 2019

(51) Int. Cl.
*G03G 9/087*     (2006.01)
*G03G 9/093*     (2006.01)
*B41M 3/14*     (2006.01)
*C09D 11/40*     (2014.01)
*G03G 9/09*     (2006.01)

(52) U.S. Cl.
CPC .......... *G03G 9/09328* (2013.01); *B41M 3/14* (2013.01); *C09D 11/40* (2013.01); *G03G 9/08753* (2013.01); *G03G 9/091* (2013.01); *G03G 9/0902* (2013.01); *G03G 9/092* (2013.01); *G03G 9/0906* (2013.01); *G03G 9/0908* (2013.01); *G03G 9/0912* (2013.01); *G03G 9/0914* (2013.01); *G03G 9/0916* (2013.01); *G03G 9/0918* (2013.01); *G03G 9/0926* (2013.01); *G03G 9/09392* (2013.01)

(58) Field of Classification Search
CPC ............ G03G 9/0804; G03G 9/08755; G03G 9/0902; G03G 9/0906; G03G 9/0918; G03G 9/092; G03G 9/0926
See application file for complete search history.

(56) References Cited

U.S. PATENT DOCUMENTS

| | | | |
|---|---|---|---|
| 5,278,020 | A | 1/1994 | Grushkin et al. |
| 5,290,654 | A | 3/1994 | Sacripante et al. |
| 5,301,044 | A | 4/1994 | Wright |
| 5,308,734 | A | 5/1994 | Sacripante et al. |
| 5,344,738 | A | 9/1994 | Kmiecik-Lawrynowicz et al. |
| 5,346,797 | A | 9/1994 | Kmiecik-Lawrynowicz et al. |
| 5,348,832 | A | 9/1994 | Sacripante et al. |
| 5,364,729 | A | 11/1994 | Kmiecik-Lawrynowicz et al. |
| 5,366,841 | A | 11/1994 | Patel et al. |
| 5,370,963 | A | 12/1994 | Patel et al. |
| 5,385,803 | A | 1/1995 | Duff et al. |
| 5,403,693 | A | 4/1995 | Patel et al. |

(Continued)

OTHER PUBLICATIONS

R. Lowry, et al. Ceramic Taggants for Authentication or Provenance Marking of Electronic Components. pp. 1-29.

(Continued)

*Primary Examiner* — Peter L Vajda
(74) *Attorney, Agent, or Firm* — Pillsbury Winthrop Shaw Pittman LLP

(57) ABSTRACT

The present disclosure relates to toner compositions containing an IR-taggant, and method of making thereof. The disclosure also relates to method for confirming authenticity of an item.

18 Claims, 1 Drawing Sheet

(56) References Cited

U.S. PATENT DOCUMENTS

| | | |
|---|---|---|
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 6,063,827 A | 5/2000 | Sacripante et al. |
| 6,593,049 B1 | 7/2003 | Veregin et al. |
| 6,704,538 B2 * | 3/2004 | Nakamura ............ G03G 9/0908 219/216 |
| 6,756,176 B2 | 6/2004 | Stegamat et al. |
| 6,830,860 B2 | 12/2004 | Sacripante et al. |
| 7,929,409 B2 | 4/2011 | Chitrapu et al. |
| 9,139,768 B2 | 9/2015 | Talyansky et al. |
| 9,382,432 B1 | 7/2016 | McDaniel |
| 2004/0253419 A1 | 12/2004 | Bleikolm et al. |
| 2006/0222991 A1 | 10/2006 | Sacripante et al. |
| 2009/0045360 A1 | 2/2009 | Wosnick et al. |
| 2010/0173239 A1 * | 7/2010 | Iftime .................. G03G 9/0806 430/107.1 |
| 2011/0086302 A1 | 4/2011 | Zhou et al. |
| 2011/0086303 A1 * | 4/2011 | Zhou .................... G03G 9/0804 430/105 |
| 2011/0207044 A1 * | 8/2011 | Zwartz .............. G03G 9/08755 430/105 |
| 2012/0052433 A1 | 3/2012 | Chen et al. |
| 2013/0260301 A1 * | 10/2013 | Yamauchi ................ B41M 3/14 430/105 |
| 2017/0248859 A1 | 8/2017 | Sacripante et al. |

OTHER PUBLICATIONS

Stardust, Printing & Packaging Security Solutions. pp. 1-4.
W. Jiang, et al. Optimizing the Synthesis of Red- to Near-IR-Emitting CdS-Capped CdTexSe1-x Alloyed Quantum Dots for Biomedical Imaging. Chem. Mater., 2006, 18 (20), pp. 4845-4854.
European Patent Office, Extended European Search Report re Patent Application No. 19152921.3 dated May 17, 2019, pp. 1-8.

* cited by examiner

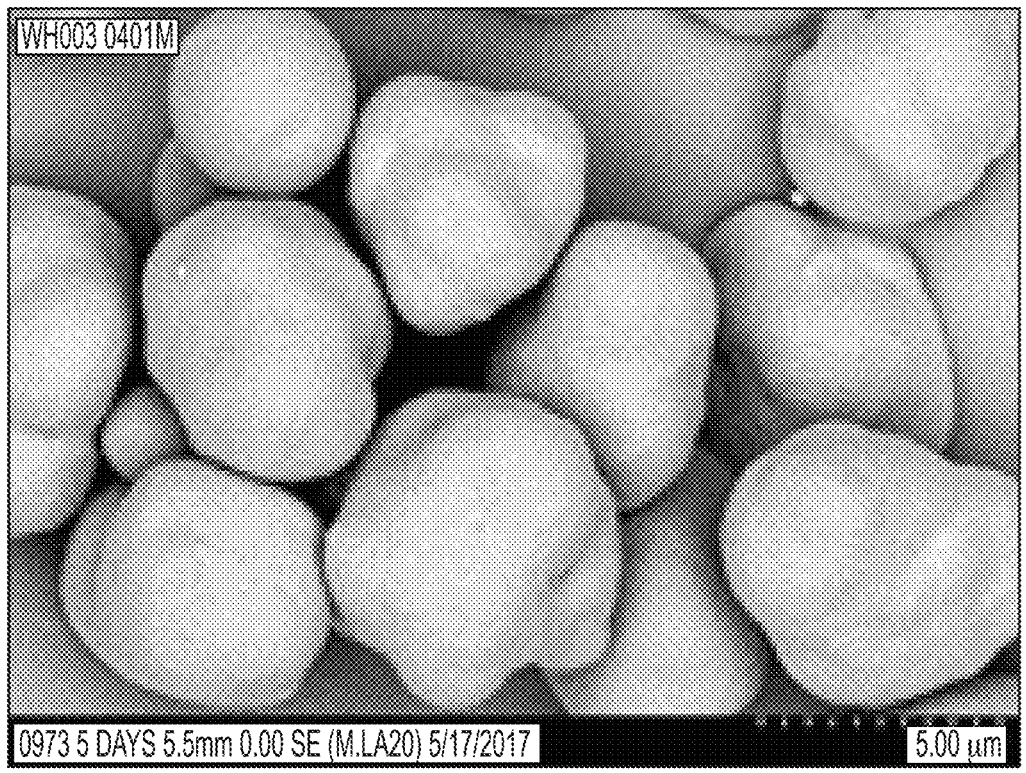

SECURITY TONER AND PROCESS USING THEREOF

INTRODUCTION

The present disclosure is generally related to toner processes and, more specifically, to preparation of security toner compositions having an IR (infrared) taggant which may be useful for a variety of applications that require authentication, including for example, document security.

IR-taggants may be used as an authenticating feature in the document security industry. Secure documents, for example documents that are difficult to forge, such as tickets, bank notes, identification cards, security badges, and the like, may be conventionally created using toners containing IR-taggants either alone, or in combination with ordinary toners and/or pigments. Features printed using toners containing IR-taggants are usually invisible under visible light, due to the colorless nature of the security toners or due to masking by other colorants in the document. The images produced from the security toners are detectable by a sensor that detects wavelengths invisible to the human eye, such as an infrared detector. These features provide an increased level of security against counterfeiters by making the copying process of such a document more difficult.

There is a continuous need to provide novel compositions for toner compositions and security printing technologies to provide customers with excellent image quality on the substrates.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided an emulsion aggregation toner having toner particles comprising a core and a shell, wherein the core comprising an IR-taggant comprises an inorganic ceramic nanoparticle, IR-emitting organic dye, or IR-emitting quantum dot; a crystalline polyester resin; and an amorphous polyester resin.

In certain embodiments, there is provided a method for providing an emulsion aggregation toner for authenticating an item, comprising forming an IR-taggant dispersion in water, wherein the emulsion comprises an IR-taggant, a surfactant and a colorant; mixing the IR-taggant dispersion with a resin dispersion, wherein the resin dispersion comprises a crystalline polyester resin and an amorphous polyester resin to form a latex emulsion; aggregating the latex emulsion to form toner particle cores; forming a shell over the toner particle cores to form toner particles; coalescing the toner particles; and cooling the toner particles.

In certain embodiments, there is provided a method for confirming authenticity of an item, comprising using an emulsion aggregation toner for use in a printing apparatus to form text or image on a substrate, wherein the emulsion aggregation toner comprises an IR-taggant comprises an inorganic ceramic nanoparticle, IR-emitting organic pigment, or IR-emitting quantum dot; a crystalline polyester resin; and an amorphous polyester resin; exposing the formed text or image on the substrate to infrared light; detecting the IR-emitting feature upon exposure to the infrared light.

BRIEF DESCRIPTION OF THE DRAWINGS

For a better understanding of the present embodiments, reference may be made to the accompanying FIGURES.

FIG. 1 is a scanning electron microscope (SEM) photograph, at a magnification of 6.00K times illustrating smooth particle surfaces of the EA particles of Toner Example 2 prepared according to certain embodiments of the present disclosure.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values.

The disclosure provides an emulsion aggregation toner containing one or more IR-taggants. The emulsion aggregation toner may be used for producing secure images on a substrate. In embodiments, the emulsion aggregation toner includes toner particles having a core and a shell. The IR-taggant may be incorporated into the core of the toner particles. In embodiments, the IR-taggant may be incorporated into both the core and the shell of the toner particles.

The IR-taggants used herein are materials having predetermined detectable spectral characteristics, e.g., emission characteristics, such as an emission band at a predetermined wavelength in the infrared spectral range when it is excited at a predetermined wavelength in the visible spectral range. A spectral characteristic means the wavelength dependent optical characteristic of the IR-taggant such as, but not limited to, the emission. The IR-taggant is radiated at a first predetermined wavelength and emits energy at a second predetermined wavelength that is different from the first wavelength. When the emulsion aggregation toner of the present disclosure is subjected to energy at the first predetermined wavelength, the IR-taggant therein is excited and in response emits energy at the second predetermined wavelength. The first predetermined wavelength may be in a range from about 300 to about 1100 nm, from about 500 to about 900 nm, or about 550 to about 800 nm. The second predetermined wavelength may be in a range from about 700 to about 1600 nm, from about 800 to about 1300 nm, or about 1000 to about 1200 nm.

Suitable IR-taggants for use in the emulsion aggregation toners of the present may include inorganic ceramic nanoparticle, IR-emitting organic dyes, IR-emitting quantum dot, and mixtures thereof.

Examples of the inorganic ceramic nanoparticle include, but are not limited to, silicon dioxide ($SiO_2$), yttrium oxide ($Y_2O_3$), lithium oxide ($Li_2O$), ytterbium oxide ($Yb_2O_3$), Zirconium dioxide (also known as zirconia, $ZrO_2$), $Y_3Al_5O_{12}$ (yttrium aluminum garnet, or YAG), and mixtures thereof. Examples of the IR-emitting organic dyes includes polymethine dyes, anthraquinone dyes, dithiol metal salt dyes, phthalocyanine dyes, indophenol dyes, aminium dyes, diimonium dyes, azo dyes, cyanine dyes, oxazine dyes, rhodamine dyes, distyryl-boradiazaindacene dyes and the derivatives, sulfoindocyanine succidimidyl esters, acridone dyes, and mixtures thereof. IR-emitting quantum dots (QDs) are semiconductor crystallites. Quantum confinement occurs when the size of a semiconductor crystallite is reduced below its exciton Bohr radius. Exemplary IR-emitting quantum dots can be found in U.S. Pat. No. 9,382,432 and is incorporated by reference herein. Examples of the IR-emitting quantum dots includes alloyed CdTexSe1-x/CdS quantum dots (see, "Optimizing the Synthesis of Red- to Near-IR-Emitting CdS-Capped CdTexSe1-x Alloyed Quantum Dots for Biomedical Imaging" published in Chem. Mater., 2006, 18 (20), pp 4845-4854.), CuInZnSeS quantum dot, AgInS2 and mixtures thereof. U.S. Patent Publication 20090045360 also discloses incorporation of quantum dots into toner particles for security printing and is incorporated by reference herein.

In embodiments, the average particle size (diameter) of the IR-taggant may range from about 10 nm to about 800 nm, from about 100 nm to about 500 nm, or from about 200 nm to about 300 nm.

In embodiments, the IR-taggants may be untreated or surface treated with organic silane, for example, phenylsilane, alkylsilane, 3-aminopropylsilane and allyl-functionalsilane.

The IR-taggant may be presented in the toner particles in an amount of from about 0.01 to 40 weight percent, from about 0.1 to 20 weight percent, from about 0.5 to 10 weight percent, or from about 0.8 to 8 weight percent by weight of the toner. In embodiments, the IR-taggant is present in the core of the toner particles in an amount of from about 0.1 to 40 weight percent, from about 0.5 to 20 weight percent, or from about 1 to 10 weight percent, or from about 1.5 to 8 weight percent by weight of the toner. In embodiments, the IR-taggant is present in the shell of the toner particles in an amount of from about 0.01 to 30 weight percent, from about 0.05 to 20 weight percent, or from about 0.1 to 10 weight percent, or from about 0.5 to 5 weight percent by weight of the toner. In embodiments, the IR-taggant presented in the core is the same as the IR-taggant presented in the shell. In embodiments, the IR-taggant presented in the core is different from the IR-taggant presented in the shell. In embodiments, at least one of the IR-taggants presented in the core is different from at least one of the IR-taggants presented in the shell. In embodiments, the shell of the toner does not contain an IR-taggant.

The IR-taggant emitting feature of the toners according to the present embodiments may be detected in a number of different ways. The images produced from the toner of the present disclosure may be subjected to an infrared reader whereby the IR-taggant is detected. The IR-taggant may be detected by an infrared sensor or devices. The infrared sensor or devices irradiates the toner or toner image at a first predetermined wavelength, and the toner or toner image then emits energy at a second predetermined wavelength that is read by the detective device. The device when accepting the second wavelength can make a signal such as a beeping sound.

In embodiments, the toner of the present disclosure is suitable for xerographic (also known as electrophotography) applications. Xerographic toners possess physical and chemical properties that are specific to xerographic printing systems.

The toner of the present disclosure is an emulsion aggregation (EA) toner having toner particles comprising an IR-taggant. The EA toner can be prepared by a conventional emulsion aggregation process or by a batch aggregation/continuous coalescence process or by a continuous aggregation/coalescence emulsion aggregation process. In embodiments, the toner of the present disclosure is a dry powder. The term "dry powder" as used herein refers to a composition that contains finely dispersed dry toner particles. Such a dry powder or dry particle may contain up to about 5%, up to about 2%, up to about 1%, or up to about 0.1% water or other solvent, or be substantially free of water or other solvent, or be anhydrous. In embodiments, the toner of the present disclosure contains a core and a shell.

The toner composition of the present disclosure includes a polyester resin. The polyester resin may be crystalline, amorphous or mixtures thereof. Suitable polyester resins include, for example, crystalline, amorphous, mixtures thereof, and the like. The polyester resins may be linear, branched, mixtures thereof, and the like. Polyester resins may include, in embodiments, those resins described in U.S. Pat. Nos. 6,593,049 and 6,756,176, the disclosure of each of which hereby is incorporated by reference in entirety. Suitable resins include a mixture of an amorphous polyester resin and a crystalline polyester resin as described in U.S. Pat. No. 6,830,860, the disclosure of which is hereby incorporated by reference in entirety.

Crystalline Resins

In embodiments, the crystalline resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol may be, for example, selected in an amount of from about 40 to about 60 mole % (although amounts outside of those ranges may be used).

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, and a diester or anhydride thereof. The organic diacid may be selected in an amount of, for example, in embodiments from about 40 to about 60 mole %.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(hexane-dodecanoate), poly(nonylene-sebacate), poly(nonylene-decanoate), poly(nonane-dodecanoate) (available from Kao corporation), copoly(ethylene-fumarate)-copoly(ethylene-sebacate), copoly(ethylene-fumarate)-copoly(ethylene-decanoate), copoly(ethylene-fumarate)-copoly(ethylene-dodecanoate) and so on. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

Suitable crystalline resins include those disclosed in U.S. Publ. No. 2006/0222991, the disclosure of which is hereby incorporated by reference in entirety. In embodiments, a suitable crystalline resin may be composed of ethylene glycol and a mixture of dodecanedioic acid and fumaric acid comonomers.

The crystalline resin may possess various melting points of, for example, from about 30° to about 120°, in embodiments, from about 50° to about 90° C. The crystalline resin may have a number average molecular weight (Mn) as measured by gel permeation chromatography (GPC) of, for example, from about 1,000 to about 50,000, in embodiments, from about 2,000 to about 25,000, and a weight average molecular weight (Mw) of, for example, from about 2,000 to about 100,000, in embodiments, from about 3,000 to about 80,000, as determined by GPC. The molecular weight distribution (Mw/Mn) of the crystalline resin may be, for example, from about 2 to about 6, in embodiments, from about 3 to about 4. The crystalline polyester resins may have an acid value of less than about 1 meq KOH/g, from about 0.5 to about 0.65 meq KOH/g, in embodiments, from about 0.65 to about 0.75 meq KOH/g, from about 0.75 to about 0.8 meq KOH/g.

The crystalline polyester resin may be presented in an amount of from about 1 weight percent to 25 weight percent, from about 3 weight percent to 20 weight percent, from about 5 weight percent to 15 weight percent by weight of the toner.

Amorphous Resins

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, from about 45 to about 52 mole % of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethyl-hexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, 1,2-ethanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols, such as, sodio 2-sulfa-1,2-ethanediol, lithio 2-sulfa-1,2-ethanediol, potassio 2-sulfa-1,2-ethanediol, sodio 2-sulfa-1,3-propanediol, lithio 2-sulfo-1,3-propanediol, potassio 2-sulfa-1,3-propanediol, mixtures thereof, and the like, and mixtures thereof. The amount of organic diol selected may vary, and more specifically, is, for example, from about 45 to about 52 mole % of the resin.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfa-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanedial, 2-sulfo-hexanediol, 3-sulfo-2-methylpentanediol, N,N-bis(2-hydroxyethyl)-2-aminoethane sulfonate, 2-sulfa-3,3-dimethylpent-anediol, sulfa-p-hydroxybenzoic acid, mixtures thereto, and the like. Effective difunctional monomer amounts of, for example, from about 0.1 to about 2 wt % of the resin may be selected.

Exemplary amorphous polyester resins include, but are not limited to, propoxylated bisphenol A fumarate resin, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), a copoly(propoxylated bisphenol A co-fumarate)-copoly(propoxylated bisphenol A co-terephthalate), a terpoly(propoxylated bisphenol A co-fumarate)-terpoly(propoxylated bisphenol A co-terephthalate)-terpoly-(propoxylated bisphenol A co-dodecylsuccinate), and mixtures thereof.

In embodiments, a suitable amorphous polyester resin may be a poly(propoxylated bisphenol A co-fumarate) resin having the following formula (I):

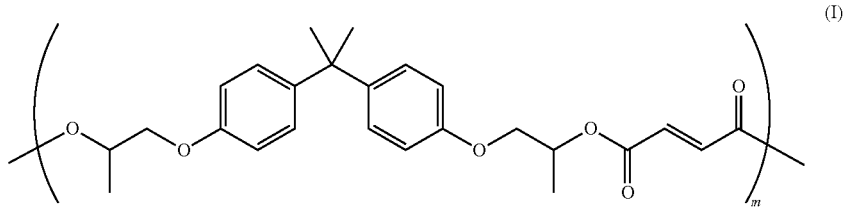

wherein m may be from about 5 to about 1000. Examples of such resins and processes for their production include those disclosed in U.S. Pat. No. 6,063,827, the disclosure of which is hereby incorporated by reference in entirety. In embodiments, the amorphous polyester resin can be obtained from Kao corporation as [poly(co-propoxylated bisphenol A co-ethoxylated bisphenol A co-terephthalate co-docecenylsuccinate co-trimellitate) resin] and [poly(co-propoxylated bisphenol A co-ethoxylated bisphenol A co-terephthalate co-fumarate co-dodecenulsuccinate) resin].

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

The amorphous resin may possess various glass transition temperatures (Tg) of, for example, from about 40° C. to about 100° C., in embodiments from about 45° C. to about 70° C., in some embodiments from 50° C. to about 65° C.

In embodiments, a combination of low weight average molecular weight (Mw) amorphous resin and high weight average molecular weight Mw amorphous resins may be used to form a toner. Low-Mw resins may have a weight-average molecular weight of approximately 10 kg/mol to approximately 20 kg/mol, and a number-average molecular weight of approximately 2 kg/mol to approximately 5 kg/mol. High-Mw resins may have a weight-average molecular weight of approximately 90 kg/mol to approximately 160 kg/mol, and a number-average molecular weight of approximately 4 kg/mol to approximately 8 kg/mol. The ratio, by weight, of low Mw to high Mw amorphous resins may be from about 0:100 to about 100:0, in embodiments from about 70:30 to about 30:70, and in some embodiments from about 60:40 to about 40:60.

In further embodiments, the combined amorphous resins may have a melt viscosity of from about 10 to about 1,000,000 Pa*S at about 130°, in embodiments, from about 50 to about 100,000 Pa*S.

The total amorphous polyester resin may be presented in an amount of from about 20 weight percent to 60 weight percent by weight of the toner. The high Mw amorphous resin may be presented in an amount of from about 20 weight percent to 50 weight percent by weight of the toner. The low Mw amorphous resin may be presented in an amount of from about 10 weight percent to 50 weight percent by weight of the toner. The amorphous polyester resin may have an average weight molecular weight of from about 8,000 to about 300,000, from about 10,000 to about 200,000, and from about 15,000 to about 150,000.

The toner composition of the present embodiments may or may not contain a cross-linked resin.

Catalyst

Polycondensation catalysts which may be utilized in forming either the crystalline or amorphous polyesters include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole % to about 5 mole %, based on the starting diacid or diester used to generate the polyester resin.

Crosslinking Resin

Linear or branched unsaturated polyesters can be converted into a highly crosslinked polyester by reactive extrusion. Linear or branched unsaturated polyesters may include both saturated and unsaturated diacids (or anhydrides) and dihydric alcohols (glycols or diols). The resulting unsaturated polyesters can be reactive (for example, crosslinkable) on two fronts: (i) unsaturation sites (double bonds) along the polyester chain, and (ii) functional groups, such as, carboxyl, hydroxy and similar groups amenable to acid-base reaction. Unsaturated polyester resins may be prepared by melt polycondensation or other polymerization processes using diacids and/or anhydrides and diols. Illustrative examples of unsaturated polyesters may include any of various polyesters, such as SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), a linear unsaturated poly(propoxylated bisphenol A co-fumarate) polyester, XP777 (Reichhold Inc.), mixtures thereof and the like. The resins may also be functionalized, such as, carboxylated, sulfonated or the like, such as, sodio sulfonated.

The crosslinked resin may be prepared by (1) melting the linear or branched unsaturated polyester in a melt mixing device; (2) initiating cross-linking of the polymer melt, preferably with a chemical crosslinking initiator and increasing reaction temperature; (3) keeping the polymer melt in the melt mixing device for a sufficient residence time that partial cross-linking of the linear or branched resin may be achieved; (4) providing sufficiently high shear during the cross-linking reaction to keep the gel particles formed and broken down during shearing and mixing and well distributed in the polymer melt; (5) optionally devolatizing the polymer melt to remove any effluent volatiles; and (6) optionally adding additional linear or branched resin after the crosslinking in order to achieve the desired level of gel content in the end resin. As used herein, the term "gel" refers to the crosslinked domains within the polymer. Chemical initiators such as, for example, organic peroxides or azo-compounds may be used for making the crosslinked resin for the invention. In one embodiment, the initiator is 1,1-di(t-butyl peroxy)-3,3,5-trimethylcyclohexane.

In one embodiment, the highly crosslinked resin is prepared from an unsaturated poly(propoxylated bisphenol A co-fumarate) polyester resin.

Colorants

As examples of suitable colorants, mention may be made of carbon black like REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™ PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, CINQUASIA MAGENTA™ available from E.I. DuPont de Nemours & Company and the like. Colorants that can be selected are black, cyan, magenta, yellow and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™ and cyan components also may be selected as colorants. Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

Wax

In addition to the polymer resin, the toners of the present disclosure also may contain a wax, which can be either a single type of wax or a mixture of two or more different waxes. A single wax can be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition. In embodiments, no wax is included in the toner composition of the present disclosure.

When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, in embodiments from about 1,000 to about 10,000. Waxes that may be used include, for example, polyolefins, such as, polyethylene, polypropylene and polybutene waxes, such as, commercially available from Allied Chemical and Petrolite Corporation, for example POLYWAX™ polyethylene waxes from Baker Petrolite, wax emulsions available from Michaelman, Inc. and the Daniels Products Company, EPOLENE-N-15™ commercially available from Eastman Chemical Products, Inc., and VISCOL 550P™ a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax (e.g., FNP-0090, from Nippon Seriro Co. Ltd.), microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, di propyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ and SUPERSLIP 6530™ available from Micro Powder Inc., fluorinated waxes, for example, POLYFLUO 190™, POLYFLUO 200™ POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax. Mixtures and combinations of the foregoing waxes also may be used in embodiments. Waxes may be included as, for example, fuser roll release agents.

Surface Additives

The toner composition of the present embodiments may include one or more surface additives. The surface additives may be coated onto the surface of the toner particles, which may provide a total surface area coverage of from about 50% to about 99%, from about 60% to about 90%, or from about 70% to about 80% of the toner particle. The toner composition of the present embodiment may include from about 2.7% to about 4.0%, from about 3.0% to about 3.7%, or from about 3.1% to about 3.5% of surface additive based on the total weight on the toner. The surface additives may further include silica, titania and stearates.

Thereafter, the surface additive mixture and other additives are added by the blending thereof with the toner obtained.

Surfactants

The toner composition of the present embodiments may include one or more surfactants. Examples of surfactants include, anionic surfactants, such as, diphenyl oxide disulfonate, ammonium lauryl sulfate, sodium dodecyl benzene sulfonate, dodecyl benzene sulfonic acid, sodium alkyl naphthalene sulfonate, sodium dialkyl sulfosuccinate, sodium alkyl diphenyl ether disulfonate, potassium salt of alkylphosphate, sodium polyoxyethylene lauryl ether sulfate, sodium polyoxyethylene alkyl ether sulfate, sodium polyoxyethylene alkyl ether sulfate, triethanolamine polyoxyethylene alkylether sulfate, sodium naphthalene sulfate, and sodium naphthalene sulfonate formaldehyde condensate, and mixtures thereof; and nonionic surfactants, such as, polyvinyl alcohol, methyl cellulose, ethyl cellulose, propyl cellulose, hydroxy ethyl cellulose, carboxy methylcellulose, polyoxyethylene cetyl ether, polyoxyethylene lauryl ether, polyoxyethylene octyl ether, polyoxyethylene nonylphenyl ether, polyoxyethylene oleyl ether, polyoxyethylene sorbitan monolaurate, polyoxyethylene stearyl ether, dialkylphenoxy poly(ethyleneoxy)ethanol, and mixtures thereof.

Toners of the present disclosure may possess a parent toner charge per mass ratio (Q/M) in ambient conditions (B-zone) of about 21° C./50% RH of from about 15 µC/g to about 50 µC/g, in embodiments from about 18 µC/g to about 40 µC/g, or from about 20 µC/g to about 35 µC/g.

The toners of the present disclosure may exhibit a dynamic viscosity η' in the temperature range between 100° C. o 180° C. at 5% strain at 6.28 rad/sec from about 10000 Pa·s to about 10 Pa·s, from about 5000 Pa·s to about 90 Pa·s, or from about 4000 Pa·s to about 150 Pa·s.

The average circularity of the toner particles as measured by a Flow Particle Image Analyser (FPIA 3000) is from about 0.920 to about 0.988, from about 0.930 to about 0.980, or from about 0.940 to about 0.978.

The toners described herein exhibit surprisingly desirable fusing properties. For example, low minimum fusing temperature.

Toner Preparation

The toner particles may be made by any known emulsion/aggregation process. Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832, 5,405,728, 5,366,841, 5,496,676, 5,527,658, 5,585,215, 5,650,255, 5,650,256 and 5,501,935 (spherical toners).

Toner compositions and toner particles of the present disclosure may be prepared by aggregation and coalescence processes in which smaller-sized resin particles are aggregated to the appropriate toner particle size and then coalesced to achieve the final toner particle shape and morphology.

The process of preparing EA particles may involve generating a latex emulsion (I changed this to match the claim language) including the resins described herein and an IR-taggant, optionally with surfactants, optionally with wax, optionally with colorant, and optionally with surface additives. The latex emulsion may be prepared by the known phase inversion process, such as by mixing the IR-taggant, the amorphous polyester resin, and the crystalline polyester resin in a suitable solvent, followed by the addition of an aqueous media. Suitable aqueous media used for preparing core particles includes water (e.g., deionized water). Other solvents which can be mixed with water can also be added to water. The aqueous media may include a stabilizer, and optionally a surfactant. In embodiments, the IR-taggant may be dispersed in an aqueous media to form an IR-taggant dispersion, prior to mixing with the amorphous polyester resin, and the crystalline polyester resin. The IR-taggant dispersion may further include a surfactant. The IR-taggant dispersion may further include a colorant. The surfactant to colorant ratio in the IR-taggant dispersion may be from 0.5:100 to 8:100, from 1:100 to 5:100, or from 2:100 to 4:100. The resin dispersion may be prepared by dissolving the amorphous polyester resin and the crystalline polyester resin in a suitable solvent, e.g., an organic solvent. The IR-taggant dispersion may be mixed with the resin dispersion to form a latex emulsion.

The pH of the latex emulsion may be adjusted by an acid (i.e., a pH adjustor) such as, for example, acetic acid, nitric acid or the like. In embodiments, the pH of the latex emulsion may be adjusted to from about 2 to about 4.5. Additionally, in embodiments, the mixture may be homogenized. If the latex emulsion is homogenized, homogenization may be accomplished by mixing at about 600 to about 4,000 revolutions per minute (rpm). Homogenization may be accomplished by any suitable means, including, for example, with an IKA ULTRA TURRAX T50 probe homogenizer or a Gaulin 15MR homgenizer.

Following preparation of the above latex emulsion, generally, an aggregating agent may be added to the latex emulsion. Examples of suitable aggregating agents include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. In embodiments, suitable aggregating agents include a polymetal salt such as, for example, polyaluminum chloride (PAC), polyaluminum bromide, or polyaluminum sulfosilicate.

The aggregating agent may be added to the latex emulsion to form a toner in an amount of, for example, from about 0.1 parts per hundred (pph) to about 1 pph of the toner particles, in embodiments, from about 0.25 pph to about 0.75 pph of the toner particles. In embodiments, the aggregating agent is present in the toner composition in an amount of from about 0.1 to about 1.0 percent, or of from about 0.2 to about 0.8 percent, or of from about 0.25 to about 0.5 percent by weight of the total weight of the toner particles. In embodiments, the aggregating agent may be added to the latex emulsion at a temperature that is below the glass transition temperature (Tg) of the resin.

To control aggregation and coalescence of the particles, in embodiments, the aggregating agent may be metered into the latex emulsion over time. For example, the agent may be metered into the latex emulsion over a period of from about 5 to about 240 min, in embodiments, from about 30 to about 200 min. Addition of the agent may also be done while the latex emulsion is maintained under stirred conditions, in embodiments from about 50 rpm to about 1,000 rpm, in embodiments from about 100 rpm to about 500 rpm, and at a temperature that is below the Tg of the resin.

The particles may be permitted to aggregate until a predetermined desired particle size is obtained. A predetermined desired size refers to the desired particle size as determined prior to formation, with particle size monitored during the growth process as known in the art until such particle size is achieved. Samples may be taken during the growth process and analyzed, for example with a Coulter Counter, for average particle size. The aggregation thus may proceed by maintaining the elevated temperature, or slowly raising the temperature to, for example, from about 40° C. to about 65° C., and holding the latex emulsion at that temperature for a time from about 0.5 hour to about 6 hour, in embodiments, from about 1 hour to about 5 hour, while maintaining stirring, to provide the aggregated particles. Once the predetermined desired particle size is obtained, the growth process is halted.

Growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 70° C., in embodiments, from about 40° C. to about 60° C., which may be below the Tg of the resin.

The aggregated, fused toner particles of the present invention may have a volume average diameter of from about 1 to about 15 microns, from about 1 to about 10 microns, or from about 3 to about 9 microns, and a narrow geometric size distribution (GSD) of, for example, from about 1.05 to about 1.25, or from about 1.05 to about 1.20, as measured on a Coulter Counter. The term "particle size," as used herein, or the term "size" as employed herein in reference to the term "particles," means volume weighted diameter as measured by conventional diameter measuring devices, such as a Multisizer III, sold by Coulter, Inc. Mean volume weighted diameter is the sum of the mass of each particle times the diameter of a spherical particle of equal mass and density, divided by total particle mass.

In embodiments, a shell may be formed on the aggregated particles. Any resin utilized herein to form the core may be utilized to form the shell. In embodiments, a styrene-n-butyl acrylate copolymer may be utilized to form the shell.

Following aggregation to the desired particle size, the particles then may be coalesced to the desired final shape, for batch or conventional method, the coalescence being achieved by, for example, heating the mixture to a temperature of from about 65° C. to about 95° C., in embodiments from about 70° C. to about 90° C., which may be below the melting point of a crystalline resin to prevent plasticization. Higher or lower temperatures may be used, it being understood that the temperature is a function of the resins used.

Coalescence may proceed over a period of from about 0.1 to about 9 hour, in embodiments, from about 0.5 to about 4 hour.

In continuous process, the coalescence temperature range can be from about 70° C. to about 120° C., in embodiments from about 80° C. to about 110° C., in embodiments from about 90° C. to about 105° C. and coalescence time may be from about 10 seconds to 10 minutes, including from about 10 seconds to about 10 minutes, or from about 15 seconds to 5 minutes or from about 30 seconds to 2 minutes.

After coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

Another aspect of the disclosure provides a method for confirming authenticity of an item. The method comprises using an emulsion aggregation toner of the present embodiments for use in a printing apparatus to form text or image on a substrate. Non-limitative examples of suitable substrate materials include polymeric films (such as polyester white film or polyester transparent film); papers (such as matte, glossy, lightweight, heavyweight, coated, uncoated, paperboard, cardboard, photopaper, fabric paper); containers; metal in foil form made from, for example, aluminum, tin, copper, alloys; textiles; ceramics; and combinations thereof. The method comprises exposing the formed text or image on the substrate to infrared light. The method comprises detecting the IR-emitting feature upon exposure to the infrared light, wherein the color change confirms authenticity of the item. The method comprises confirming the IR-emitting feature by a spectrometer or a detector—upon exposure to a visible light and detect a light emitted at a IR wavelength, wherein confirms authenticity of the item. The method comprises confirming an authenticity signal, such as, recognizing a color change to the formed text or image, or detecting the IR-taggant feature, upon exposure to the infrared light. The IR-emitting feature may be described such that the IR-taggant has the ability to absorb the visible light energy and emit a light at an IR energy band.

Various detectors are available to detect or scan the presence of invisible security features (IR emitting features) when they irradiates the IR-taggant toner or toner text/image with infrared radiation. Commercially available detectors include, for example, IRIS™Hand-Held Detector, VIPIR™ Invisible Print Reader, IRIS-QC High Speed In-line Reader. Detectors may output a signal such as a beep sound when it detects the IR emitting feature to confirm authenticity.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1: Preparation of Toner Particles Containing 0.5% of IR-taggant

An emulsion aggregation polyester toner was prepared at a 2 liter bench scale (about 250 grams of dry theoretical toner). About 176 g of a linear amorphous resin, referred to herein as resin A in an emulsion (about 39 solid weight % of the total resin; 27.5 weight % of the toner particles) and about 176 g of a linear amorphous resin, referred to herein as resin B in an emulsion (about 39 solid weight % of the total resin; 27.5 weight % of the toner particles), about 63 g of a crystalline polyester emulsion, about 10 g of the IR taggant dispersion prepared by sonicating the IR pigment (1.25 g) in deionized water (8.71 g) containing an anionic surfactant (0.0375 g), and about 78 g of a polyethylene wax dispersion (about 30 weight %) (commercially available from The International Group, Inc.), were added to a plastic beaker and mixed 734 g of deionized water. The pH of the mixture was adjusted to about 4.2 by adding about 41 g of nitric acid (about 0.3M). About 4.49 g of Al$_2$(SO$_4$)$_3$ (about 27.8 weight %) mixed with about 51.6 g of deionized water was added to the slurry as a flocculent under homogenization at a speed of from about 3000 rpm to about 4000 rpm for about 5 minutes. The slurry was then transferred to a 2 L Buchi reactor.

The mixture was subsequently heated to about 42°, for aggregation while mixing at a speed of about 450 rpm. When the particle size reached a certain value, for example about 5 μm, a mixture of about 89 g of the same linear amorphous resin A in an emulsion described about (about 39 weight % resin) and about 89 g of the same linear amorphous resin B in an emulsion described about (about 39 weight % resin) were added to the reactor to form a shell over the aggregated particles. The batch was further heated at about 45° C. to achieve the desired particle size. The pH of the mixture was adjusted to about 5 by adding about sodium hydroxide and EDTA. Once at the target particle size of about 5.5 microns was obtained, the aggregation step was frozen.

The reactor temperature was then increased to about 85° C., and the pH was adjusted to about 7.8 using sodium hydroxide solution (about 4 weight %), so that the particles began to coalesce. During coalescence, 6.25 g of 12% Tayca solution and 7.94 g of 0.3M nitric acid were added. After about two hours, the particles achieved about 0.973 circularity as determined by FPIA, and were cooled. The particle size was monitored with a Coulter Counter and the Geometric Size Distribution ("GSD") was determined. The final particle size, GSDv, and GSDn were about 5.96 μm, about 1.18, and about 1.21, respectively. The fines (about 1-4 microns), the coarse (about >13 microns), and circularity of the resulting particles were about 3.55%, about 0.84%, and about 0.976, respectively.

Example 2: Preparation of Toner Particles Containing 0.1% of IR-taggant

An emulsion aggregation polyester toner was prepared at a 2 liter bench scale (about 250 grams of dry theoretical toner). About 177 g of a linear amorphous resin, referred to herein as resin A in an emulsion (about 39 weight % resin) and about 177 g of a linear amorphous resin, referred to herein as resin B in an emulsion (about 39 weight % resin), about 64 g of a crystalline polyester emulsion, about 10 g of the IR taggant dispersion prepared by sonicating the IR pigment (0.25 g) in deionized water (9.74 g) containing an anionic surfactant (0.0075 g), and about 78 g of a polyethylene wax dispersion (about 30 weight %) (commercially available from The International Group, Inc.), were added to a plastic beaker and mixed 734 g of deionized water. The pH of the mixture was adjusted to about 4.2 by adding about 41 g of nitric acid (about 0.3M). About 4.49 g of Al$_2$(SO$_4$)$_3$ (about 27.8 weight %) mixed with about 51.6 g of deionized water was added to the slurry as a flocculent under homogenization at a speed of from about 3000 rpm to about 4000 rpm for about 5 minutes. The slurry was then transferred to a 2 L Buchi reactor.

The mixture was subsequently heated to about 42° C., for aggregation while mixing at a speed of about 450 rpm. When the particle size reached a certain value, for example about 5 μm, a mixture of about 89 g of the same linear amorphous resin A in an emulsion described above (about 39 weight % resin) and about 89 g of the same linear amorphous resin B in an emulsion described about (about 39 weight % resin) were added to the reactor to form a shell over the aggregated particles. The batch was further heated at about 45° C. to achieve the desired particle size. The pH of the mixture was adjusted to about 5 by adding about sodium hydroxide and EDTA. Once the target particle size of about 5.6 microns was obtained, the aggregation step was frozen.

The reactor temperature was then increased to about 85° C., and the pH was adjusted to about 7.8 using sodium hydroxide solution (about 4 weight %), so that the particles began to coalesce. During coalescence, 6.25 g of 12% Tayca solution and 7.94 g of 0.3M nitric acid were added. After about two hours, the particles achieved about 0.972 circularity as determined by FPIA, and were cooled. The particle size was monitored with a Coulter Counter and the Geometric Size Distribution ("GSD") was determined. The final particle size (average diameter), GSDv, and GSDn were about 5.93 μm, about 1.18, and about 1.23, respectively. The fines (about 1-4 microns), the coarse (about >13 microns), and circularity of the resulting particles were about 4.75%, about 0.63%, and about 0.972, respectively.

FIG. 1 shows the scanning electron microscope (SEM) photograph, at a magnification of 6.00K times illustrating smooth particle surfaces of the EA particles.

Example 3: Preparation of Blank Toner Particles with No IR-taggant

The blank toner particles were prepared according to the same process as described in Examples 1 and 2, except that the IR-taggant pigment was eliminated. The final toner particle size, GSDv, and GSDn were about 7.6 μm, about 1.19, and about 1.19, respectively. The fines (about 1-4 microns), the coarse (about >13 microns), and circularity of the resulting particles were about 3.65%, about 0.48%, and about 0.977, respectively.

Table 1 summaries the components of Toner Example 1 (with 0.5% IR-taggant incorporated) and Toner Example 2 (with 0.1% IR-taggant incorporated).

TABLE 1

| TONER ID | Toner Example 1 | Toner Example 2 |
|---|---|---|
| Core latex | 27.5% resin A<br>27.5% resin B<br>7.4% crystalline polyester<br>9% wax<br>0.1% IR taggant | 27.5% resin A<br>27.5% resin B<br>7.4% crystalline polyester<br>9% wax<br>0.5% IR taggant |
| Shell latex | 28% resin A and B mixture | 28% resin A and B mixture |

Toner Additive Blending

For each sample (Examples 1-3), about 50 g of the toner were added to a SK-M10 Sample Mill, from Misaki & Co. Ltd., along with surface additives and then blended for about 30 seconds at approximately 12,500 rpm. Surface additives used in the blending included 1.29% RY50L silica, 0.86% RX50 silica, 0.88% STT100H titania, 1.73% X24 sol-gel colloidal silica, 0.18% zinc stearate, 0.5% polymethylmethacrylate (PMMA), and 0.28% cerium oxide particles, by weight of the toner.

Toner Charging Measurement

Toner charging was collected for both the parent toner particles without any surface additives, and for the blended toner particles with surface additives. For the parent toner particles, 1.5 grams of toner and 30 grams of XEROX® 700 carrier were mixed in a 60 mL glass bottle, to prepare a 5 pph (parts per hundreds) of toner in carrier. For the blended toner, 1.8 grams of toner and 30 grams of Xerox 700 carrier were mixed in a 60 mL glass bottle, to prepare a 8 pph of toner in carrier. Samples were conditioned three days in a low-humidity zone (J zone) at 21.1° C. and 10% RH), and in a separate sample in a high humidity zone (A zone) at about 28° C./85% relative humidity. The developers with parent toner particles were charged in a Turbula mixer for 10 minutes, the developers with additive blended toner were charged in a Turbula mixer for 60 minutes.

The toner charge was measured as the charge per mass ratio (Q/M) and determined by the total blow-off charge method, measuring the charge on a Faraday cage containing the developer after removing the toner by blow-off in a stream of air. The total charge collected in the cage is divided by the mass of toner removed by the blow-off, by weighing the cage before and after blow-off to give the Q/M ratio. The toner charge was also measured in the form of q/d, the charge to diameter ratio. The q/d was measured using a charge spectrograph with a 100 V/cm field, and was measured visually as the midpoint of the toner charge distribution. The charge was reported in millimeters of displacement from the zero line (mm displacement can be converted to femtocoulombs/micron (fC/μm) by multiplying by 0.092).

Toner Charge Maintenance Measurement

A developer sample was prepared by weighing 1.8 g of additive toner onto 30 g of carrier in a washed 60 ml glass bottle. The developer was conditioned in an A-zone environment of 28° C./85% RH for three days to equilibrate fully. The developer was charged by agitating the sample for 2' in a Turbula mixer. The charge per unit mass of the sample was measured using a tribo blow-off. The sample was then returned to the A-zone chamber in an idle position. The charge per unit mass measurement was repeated again after 24 hours and 7 days. Charge maintenance was calculated from the 24 h and 7 day charge as a percentage of the initial charge. The charging results of the toners are shown in Tables 2 and 3.

TABLE 2

| | | 60 min (after mixing) additive charging, 5 pph Toner Carrier | | | | | |
|---|---|---|---|---|---|---|---|
| | | A-zone | | J-zone | | RH ratio | |
| Toner ID | Toner Composition | Az add Q/d | Az add Q/m | Jz add Q/d | Jz add Q/m | Add RH Q/d | Add RH Q/m |
| Example 1 | 0.5% IR taggant | 4.9 | 25 | 14.7 | 72 | 0.33 | 0.35 |
| Example 2 | 0.1% IR taggant | 5.1 | 20 | 15.5 | 61 | 0.33 | 0.35 |
| Example 3 | Black - no IR taggant | 6.1 | 17 | 17.1 | 49 | 0.35 | 0.35 |

TABLE 3

| | | 10 min (after mixing) parent charging, 8 pph Toner Carrier | | | | | |
|---|---|---|---|---|---|---|---|
| | | A-zone | | J-zone | | RH ratio | |
| Toner ID | Toner Composition | Az Parent Q/d | Az Parent Q/m | Jz Parent Q/d | Jz Parent Q/m | Parent RH Q/d | Parent RH Q/m |
| Example 1 | 0.5% IR taggant | 2.6 | 13 | 15.9 | 84 | 0.16 | 0.15 |
| Example 2 | 0.1% IR taggant | 2.8 | 12 | 18.1 | 79 | 0.16 | 0.15 |
| Example 3 | Black - no IR taggant | 3.8 | 9 | 21.9 | 66 | 0.17 | 0.14 |

Toner Blocking Measurement

Toner blocking was determined by measuring the toner cohesion at elevated temperature above room temperature for the toner blended with surface additives. Toner blocking measurement was completed as follows: two grams of additive blended toner was weighed into an open dish and conditioned in an environmental chamber at the specified elevated temperature and 50% relative humidity. After about 17 hours, the samples were removed and acclimated in ambient conditions for about 30 minutes. Each re-acclimated sample was measured by sieving through a stack of two pre-weighed mesh sieves, which were stacked as follows: 1000 μm on top and 106 μm on bottom. The sieves were vibrated for about 90 seconds at about 1 mm amplitude with a Hosokawa flow tester. After the vibration was completed the sieves were reweighed and toner blocking is calculated from the total amount of toner remaining on both sieves as a percentage of the starting weight. For example, by demonstrating with a 2 gram toner sample, suppose A is the weight of toner left the top 1000 μm screen and B is the weight of toner left the bottom 106 μm screen, then the toner blocking percentage is calculated by: % blocking=50 (A+B).

Toner Flow Cohesion Measurement

Two grams of the blended toner at lab ambient conditions was placed on the top screen in a stack of three pre-weighed mesh sieves, which were stacked in a Hosokawa flow tester in the following manner: 53 μm on top, 45 μm in the middle, and 38 μm on the bottom. A vibration of 1 mm amplitude was applied to the stack for 90 seconds. The flow cohesion % is calculated as: % Cohesion=(50*A+30*B+10*C)

Dielectric Loss Measurement

Dielectric loss of the parent toner particles (i.e., toner particles without external additives) was measured in a custom-made fixture connected to an HP4263B LCR Meter via shielded 1 meter BNC cables. To ensure reproducibility and consistency, one gram of toner (conditioned in J-zone 24 hours) was placed in a mold having a 2-inch diameter and pressed by a precision-ground plunger at about 2000 psi for 2 minutes. While maintaining contact with the plunger (which acted as one electrode), the pellet was then forced out of the mold onto a spring-loaded support, which kept the pellet under pressure and also acted as the counter-electrode. The current set-up eliminated the need for using additional contact materials (such as tin foils or grease) and also enabled the in-situ measurement of pellet thickness. Dielectric and dielectric loss were determined by measuring the capacitance (Cp) and the loss factor (D) at 100 KHz frequency and 1 VAC. The measurements were carried out under ambient conditions. The dielectric constant was calculated as follows:

$$E'=[C_p \text{ (pF)} \times \text{Thickness (mm)}]/[8.854 \times A\text{effective (m}^2\text{)}]$$

The constant 8.854 was the vacuum electrical permittivity epsilon(o) in units that takes into account that Cp is in picofarads, and Thickness is in mm. Aeffective is the effective area of the sample. Dielectric loss (E')=E*Dissipation factor, which represents the electrical dissipation in the sample (i.e., how leaky the capacitor is). The dielectric loss (E') is multiplied by 1000 to simplify the values reported. Thus, a reported "dielectric loss×1000" value of 70 indicates a dielectric loss of $70 \times 10^{-3}$, or 0.070.

Fusing Measurement

Fusing characteristics of the toners blended with additives were determined by crease area, minimum fixing temperature (MFT), gloss, document offset, and vinyl offset testing.

All unfused images were generated using a Xerox Color 560 printer. A TMA (Toner Mass per unit Area) of 1.00 mg/cm² was used for the amount of toner placed onto Xerox Bold 90 gsm, uncoated paper (P/N 3R11540) and used for gloss, crease and hot offset measurements. Gloss/crease targets were a square image placed in the centre of the page. Samples were then fused with an oil-less fusing fixture, consisting of a Xerox 700 production fuser CRU that was fitted with an external motor and temperature control along with paper transports. Process speed of the fuser was set to 220 mm/s (nip dwell of ~34 ms) and the fuser roll temperature was varied from cold offset to hot offset or up to 210° C. for gloss and crease measurements on the samples. After the set point temperature of the fuser roll has been changed, there is a wait time of ten minutes to allow the temperature of the belt and pressure assembly to stabilize.

Cold offset is the temperature at which toner sticks to the fuser, but is not yet fusing to the paper. Above the cold offset temperature the toner does not offset to the fuser until it reaches the Hot offset temperature.

Crease Area

The toner image displays mechanical properties such as crease, as determined by creasing a section of the substrate such as paper with a toned image thereon and quantifying the degree to which the toner in the crease separates from the paper. A good crease resistance may be considered a value of less than 1 mm, where the average width of the creased image is measured by printing an image on paper, followed by (a) folding inwards the printed area of the image, (b) passing over the folded image a standard Teflon™ coated copper roll weighing about 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing; measured in terms of area, crease values of 100 millimeters correspond to about 1 mm in width. Further, the images exhibit fracture coefficients, for example of greater than unity.

From the image analysis of the creased area, it is possible to determine whether the image shows a small single crack line or is more brittle and easily cracked. A single crack line in the creased area provides a fracture coefficient of unity while a highly cracked crease exhibits a fracture coefficient of greater than unity. The greater the cracking, the greater the fracture coefficient.

Toners exhibiting acceptable mechanical properties, which are suitable for office documents, may be obtained by utilizing the aforementioned thermoplastic resins. However, there is also a need for digital xerographic applications for flexible packaging on various substrates. For flexible packaging applications, the toner materials must meet very demanding requirements such as being able to withstand the high temperature conditions to which they are exposed in the packaging process and enabling hot pressure-resistance of the images. Other applications, such as books and manuals, require that the image does not document offset onto the adjacent image. These additional requirements require alternate resin systems, for example that provide thermoset properties such that a crosslinked resin results after fusing or post-fusing on the toner image.

Minimum Fixing Temperature

The Minimum Fixing Temperature (MFT) measurement involves folding an image on paper fused at a specific temperature, and rolling a standard weight across the fold. The print can also be folded using a commercially available folder such as the Duplo D-590 paper folder. The folded image is then unfolded and analyzed under the microscope and assessed a numerical grade based on the amount of crease showing in the fold. This procedure is repeated at various temperatures until the minimum fusing temperature (showing very little crease) is obtained.

Gloss

Print gloss (Gardner gloss units or "ggu") was measured using a 75 degree BYK Gardner gloss meter for toner images that had been fused at a fuser roll temperature range of about 120° C. to about 210° C. (sample gloss was dependent on the toner, the toner mass per unit area, the paper substrate, the fuser roll, and fuser roll temperature).

Gloss Mottle

The gloss mottle temperature is the temperature at which the print shows a mottled texture, characterized by non-uniform gloss on the mm scale on the print, and is due to the toner beginning to stick to the fuser in small areas.

Hot Offset

The hot offset temperature (HOT) is that temperature that toner that has contaminated the fuser roll is seen to transfer back onto paper. To observe it a blank piece of paper, a chase sheet, is sent through the fuser right after the print with the fused image. If an image offset is notice on the blank chase sheet at a certain fuser temperature then this is the hot offset temperature Tables 4 and 5 below summarize the fusing fixture evaluation results.

TABLE 4

| Toner ID | Toner Composition | Charge Maintenance 24 h CM | Charge Maintenance 7 d CM | Blocking Onset | Cohesion | Dielectric Loss* 1000 |
|---|---|---|---|---|---|---|
| Example 1 | 0.5% IR taggant | 76 | 55 | 55.6 | 25 | 21 |
| Example 2 | 0.1% IR taggant | 75 | 54 | 55.7 | 22 | 20 |
| Example 3 | Blank - no IR taggant | 75 | 50 | 57.1 | 9 | 19 |

TABLE 5

| Toner ID | Toner Composition | Gloss Temp (° C.) T(G40) | Peak Gloss $G_{max}$ | Cold offset (° C.) | Hot offset (° C.) | Crease MFT T($C_{80}$) |
|---|---|---|---|---|---|---|
| Example 1 | (0.5% IR-taggant) | 129 | 55.2 | 114 | 201 | 140 |
| Example 2 | (0.1% IR-taggant) | 133 | 57.4 | 118 | 211 | 142 |
| Blank toner | (no IR-taggant) | 139 | 57.4 | 118 | 196 | n/a |

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An emulsion aggregation toner having toner particles comprising a core and a shell, wherein the core comprises
    an IR-taggant selected from the group consisting of an inorganic ceramic nanoparticle, an IR-emitting organic dye, and an IR-emitting quantum dot;
        wherein the IR-taggant has an emission peak in the wavelength range of about 1000 to 1200 nm;
    a crystalline polyester resin; and
    an amorphous polyester resin.

2. The toner composition of claim 1 wherein the IR-taggant is present in an amount of from about 0.01 weight percent to 40 weight percent by weight of the toner.

3. The toner composition of claim 1 wherein the IR-taggant has an absorption peak in the wavelength range of about 300 to about 1100 nm.

4. The toner composition of claim 1 wherein the IR-taggant has an average particle size of from about 10 nm to about 800 nm.

5. The toner composition of claim 1 wherein the inorganic ceramic nanoparticle is selected from the group consisting of silicon oxide, yttrium oxide, lithium oxide, ytterbium oxide, and mixtures thereof.

6. The toner composition of claim 1 wherein the IR-emitting organic dye is selected from the group consisting of polymethine dyes, anthraquinone dyes, dithiol metal salt dyes, phthalocyanine dyes, indophenol dyes, aminium dyes, diimonium dyes, azo dyes, cyanine dyes, oxazine dyes, rhodamine dyes, distyryl-boradiazaindacene dyes, sulfoindocyanine succidimidyl esters, acridone dyes, and mixtures thereof.

7. The toner composition of claim 1 wherein the IR-emitting quantum dots is selected from the group consisting of CdTexSe1-x/CdS quantum dots, CuInZnSeS quantum dot, AgInS$_2$ and mixtures thereof.

8. The toner composition of claim 1 wherein the toner particles having an average particle size of from about 1 to about 15 microns.

9. The toner composition of claim 1, wherein the crystalline polyester resin is selected from the group consisting of poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(hexane-dodecanoate), poly(nonylene-sebacate), poly(nonylene-decanoate), poly(nonane-dodecanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide), poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

10. The toner composition of claim 1, wherein the crystalline polyester resin is presented in an amount of from about 5 weight percent to 25 weight percent by weight of the toner.

11. The toner composition of claim 1, wherein the amorphous polyester resin is selected from the group consisting of propoxylated bisphenol A fumarate resin, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly( 1,2 -propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly( 1,2 -propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly( 1,2 -propylene itaconate), a copoly(propoxylated bisphenol A co-fumarate) -copoly(propoxylated bisphenol A co-terephthalate), a terpoly(propoxylated bisphenol A co-fumarate)-terpoly(propoxylated bisphenol A co-terephthalate)-terpoly-(propoxylated bisphenol A co-dodecylsuccinate), and mixtures thereof.

12. The toner composition of claim 1, wherein the amorphous polyester resin is presented in an amount of from about 20 weight percent to 60 weight percent by weight of the toner.

13. The toner composition of claim 1, wherein the toner composition further comprises a surfactant selected from the group consisting of an anionic surfactant, a nonionic surfactant, and mixtures thereof.

14. The toner composition of claim 1, wherein the toner composition is a dry powder.

15. A method for providing an emulsion aggregation toner for authenticating an item, comprising:
    forming an IR-taggant dispersion in water, wherein the emulsion comprises an IR-taggant, a surfactant and a colorant;
    mixing the IR-taggant dispersion with a resin dispersion, wherein the resin dispersion comprises a crystalline polyester resin and an amorphous polyester resin to form a latex emulsion;
    aggregating the latex emulsion to form toner particle cores;
    forming a shell over the toner particle cores to form toner particles;
    coalescing the toner particles; and
    cooling the toner particles;
wherein the IR-taggant is selected from the group consisting of an inorganic ceramic nanoparticle, an IR-emitting organic dye, and an IR-emitting quantum dot; further wherein the IR-taggant has an emission peak in the wavelength range of about 1000 to 1200 nm.

16. The method of claim 15, wherein the weight ratio of the surfactant to the colorant is from about 0.5:100 to about 8:100.

17. A method for confirming authenticity of an item, comprising:
- using an emulsion aggregation toner for use in a printing apparatus to form text or image on a substrate, wherein the emulsion aggregation toner comprises:
  - an IR-taggant is selected from the group consisting of an inorganic ceramic nanoparticle, an IR-emitting organic dye, and an IR-emitting quantum dot; wherein the IR-taggant has an emission peak in the wavelength range of about 1000 to 1200 nm;
  - a crystalline polyester resin; and
- an amorphous polyester resin;
- exposing the formed text or image on the substrate to infrared light;
- detecting the IR-emitting feature upon exposure to the infrared light.

18. The method of claim 17 wherein the inorganic ceramic nanoparticle is selected from the group consisting of yttrium oxide, lithium oxide, ytterbium oxide, and mixtures thereof.

\* \* \* \* \*